(12) United States Patent
DeLise, Jr.

(10) Patent No.: US 9,449,534 B2
(45) Date of Patent: Sep. 20, 2016

(54) METHOD FOR MANUFACTURING EXTENDED CONTENT BOOKLET LABELS

(71) Applicant: MiniGraphics, Inc., Hauppauge, NY (US)

(72) Inventor: Stephen W. DeLise, Jr., West Islip, NY (US)

(73) Assignee: MINIGRAPHICS, INC., Hauppauge, NY (US)

( * ) Notice: Subject to any disclaimer, the term of this patent is extended or adjusted under 35 U.S.C. 154(b) by 0 days.

(21) Appl. No.: 14/623,618

(22) Filed: Feb. 17, 2015

(65) Prior Publication Data

US 2015/0161917 A1 Jun. 11, 2015

Related U.S. Application Data

(63) Continuation-in-part of application No. 13/483,355, filed on May 30, 2012, now Pat. No. 8,980,037.

(51) Int. Cl.
| | |
|---|---|
| G09F 3/02 | (2006.01) |
| G09F 3/00 | (2006.01) |
| B32B 38/00 | (2006.01) |
| B31D 1/02 | (2006.01) |
| G09F 3/10 | (2006.01) |
| B32B 37/22 | (2006.01) |
| B32B 37/26 | (2006.01) |
| B42C 3/00 | (2006.01) |
| B42D 15/00 | (2006.01) |

(52) U.S. Cl.
CPC ............ *G09F 3/0289* (2013.01); *B31D 1/021* (2013.01); *B31D 1/022* (2013.01); *B32B 37/226* (2013.01); *B32B 38/0004* (2013.01); *G09F 3/10* (2013.01); *B32B 2037/268* (2013.01); *B32B 2519/00* (2013.01); *B42C 3/00* (2013.01); *B42D 15/008* (2013.01); *Y10T 156/10* (2015.01); *Y10T 156/1051* (2015.01); *Y10T 156/1052* (2015.01)

(58) Field of Classification Search
None
See application file for complete search history.

(56) References Cited

U.S. PATENT DOCUMENTS

| | | |
|---|---|---|
| 4,991,878 A | 2/1991 | Cowan et al. |
| RE34,366 E | 9/1993 | Instance |
| 5,290,616 A | 3/1994 | Cowan et al. |
| 5,324,559 A | 6/1994 | Brombacher |
| 5,588,239 A | 12/1996 | Anderson |
| 5,685,530 A | 11/1997 | DeLise |
| 5,813,700 A | 9/1998 | Vijuk et al. |

(Continued)

FOREIGN PATENT DOCUMENTS

GB 2303351 2/1997

OTHER PUBLICATIONS

International Search Report and Written Opinion from International Stage Application No. PCT/US2013/070939 dated Apr. 4, 2014.

(Continued)

*Primary Examiner* — Barbara J Musser
(74) *Attorney, Agent, or Firm* — Keusey & Associates, P.C.

(57) ABSTRACT

A method for manufacturing an instructional booklet mounted on a substrate. A multi-up book log is provided having two or more booklets and a waste zone that share a common spine. The book log is adhered to an overlaminate and progressively slit to form overlaminate strips having booklets adhered thereto. The overlaminate is applied to a substrate with the booklets retained therebetween. The overlaminate and substrate are die cut around the booklets.

20 Claims, 14 Drawing Sheets

(56) References Cited

U.S. PATENT DOCUMENTS

| | | |
|---|---|---|
| 5,830,550 A | 11/1998 | Treleaven et al. |
| 5,860,238 A | 1/1999 | Anderson |
| 6,027,598 A | 2/2000 | Anderson |
| 6,179,335 B1 | 1/2001 | DeLise, Jr. |
| 6,213,520 B1 | 4/2001 | Treleaven et al. |
| 6,432,499 B1 | 8/2002 | Roth et al. |
| 6,432,500 B1 | 8/2002 | Jones et al. |
| 6,439,614 B1 | 8/2002 | Cowan |
| 6,576,315 B2 | 6/2003 | Treleaven et al. |
| 6,712,398 B1 | 3/2004 | Fox et al. |
| 6,737,137 B2 | 5/2004 | Franko, Sr. et al. |
| 6,948,743 B1 | 9/2005 | Peterson |
| 7,947,351 B1 | 5/2011 | Cowan |
| 2001/0011821 A1 | 8/2001 | Lind |
| 2006/0204700 A1* | 9/2006 | Kiraly .................. G09F 3/0289 428/40.1 |
| 2011/0223368 A1 | 9/2011 | Zietlow et al. |

OTHER PUBLICATIONS

International Search Report and Written Opinion from Int'l. Stage PCT Application No. PCT/US2013/070951 dated Apr. 25, 2014.

\* cited by examiner

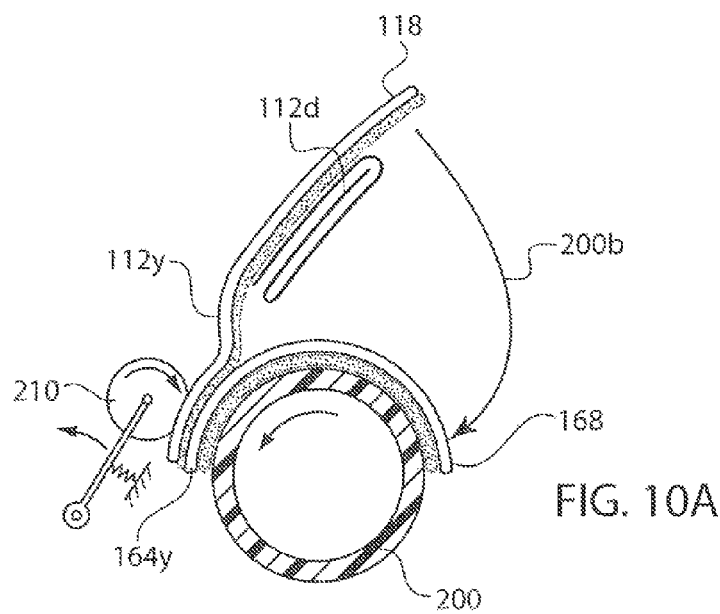
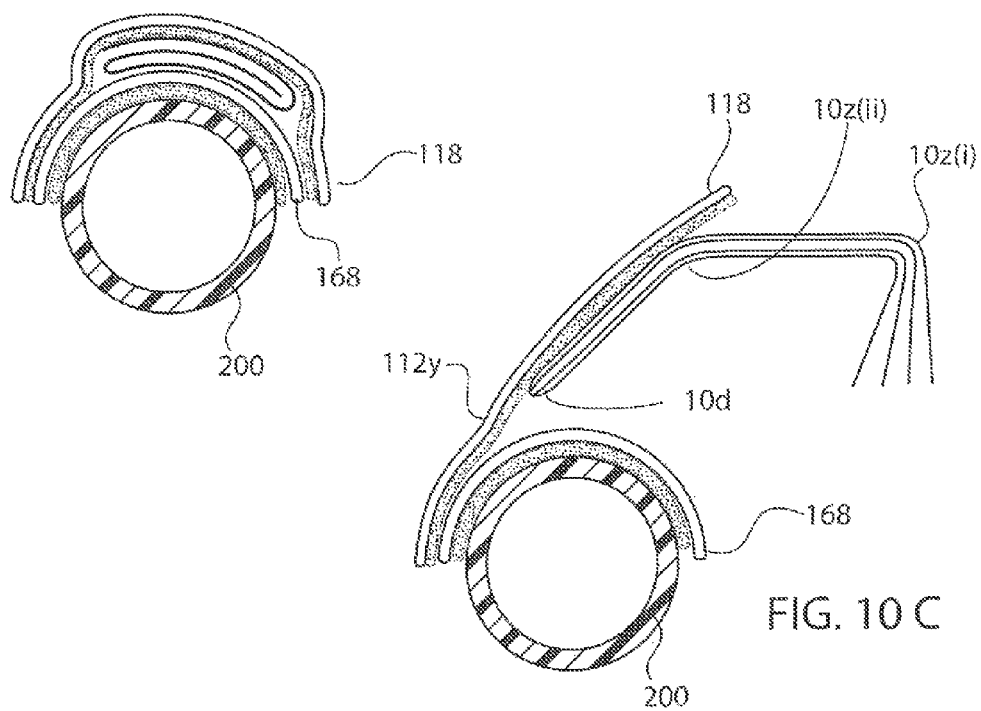

METHOD FOR MANUFACTURING EXTENDED CONTENT BOOKLET LABELS

CROSS-REFERENCE TO RELATED APPLICATIONS

This application is a continuation-in-part of U.S. patent application Ser. No. 13/483,355 filed on May 30, 2012, now U.S. Pat. No. 8,980,037.

BACKGROUND OF THE INVENTION

1. Field of the Invention

The invention relates to methods for manufacturing extended content booklet labels (ECBL).

2. The Prior Art

Frequently product containers are identified by applying an adhesive-backed label to an outer surface of the container. Such labels retain their product-identifying purpose by remaining permanently affixed to the container.

Certain products which require extensive instructions or which are subject to significant government regulations require additional printed matter which is typically inserted into the product container. In the case of pharmaceuticals, the printed matter may be in the form of printed sheets, printed inserts, or printed outserts. An example of such may be seen in U.S. Pat. No. 5,685,530. While these various forms of printed matter have the benefit of providing a relatively large amount of information, their overall effectiveness is limited if they become separated from the product container.

U.S. Pat. No. 5,830,550 entitled Booklets and Self Adhesive Labels Including the Same shows single labels and multi-up booklets adhered to a continuous web. A label product including a release liner having an upper surface and a booklet disposed on the upper surface of the release liner. In all embodiments, the booklets are first adhered to the continuous web. The booklet includes an outer piece including a top panel and a bottom panel joined by an outer fold, an inner piece disposed between the top and bottom panels having a pair of interior panels joined by an inner fold, attaching means coupling the outer and inner pieces to one another at the outer and inner folds, and a tear line formed in the bottom panel adjacent the outer fold.

U.S. Pat. No. 6,576,315 entitled Multi-Ply Resealable Label shows booklets with windows adhered to a continuous web. A label includes a base label having upper and lower opposed surfaces and first and second opposed ends. A base adhesive coats the lower surface of the base label. A top panel overlies the upper surface of the base label and is joined to the base label adjacent the first end. The top panel has an upper surface. A tab having upper and lower opposed surfaces overlies the upper surface of the base label. An adhesive patch is interposed between the base label and the tab adjacent the second end. The adhesive patch secures the lower surface of the tab to the upper surface of the base label. A laminate cover overlies the top panel and the tab. A laminate adhesive secures the laminate cover to the upper surface of the top panel and releasably joins the laminate cover to the upper surface of the tab.

U.S. Pat. No. 6,432,500 entitled Label with Booklet shows a label with an overlaminate that extends beyond the label perimeter. A label with booklet comprises a liner material and a label having an upper and lower surface located on the liner. The label is secured to the liner by an adhesive layer on its lower surface such that the label can be peeled off the liner with the adhesive remaining on the lower surface of the label. A booklet is affixed to the upper surface of the label and comprises a plurality of stacked pages having edges including a top page and a bottom page, each of the pages being coextensive with each other and of smaller dimensions than the label. The booklet further comprises a cover member entirely covering the top page and extending beyond at least two opposing edges of the top page, the cover member having an upper non-adhesive surface, and a lower surface having an adhesive thereon by means of which the lower surface of the cover member is permanently adhered to the upper surface of the top page. The booklet is completely removable from the label by removing at least a portion of the cover member.

U.S. Pat. No. 6,432,499 entitled Nested Label shows a label with die cut windows applied to a release liner. A nested label includes a liner having a surface release, and a label removably bonded to the liner by an adhesive. The liner and label have respective die cuts spaced apart from each other at a skip in the liner release for obtaining different bond strengths between the label and liner on opposite sides of the label die cut.

U.S. Pat. No. 6,948,743 entitled Multilayer Label and Method of Making Same shows multi-page labels with staggered sheets to facilitate application to curved containers. A multiple layer label and a method of making the same are provided. Specifically, a label having a base layer for adhering to a container is provided wherein the label has an overcoat layer having an end that is removably adhered to the container. Moreover, the end that is removably adhered to the container is grasped by a user of the label and pulled, thereby removing the end of the overcoat layer from the container and swinging the layer away from the remainder of the label and exposing sublayers beneath the overcoat layer. The overcoat layer is adhered directly to the base layer, and at least portions of the sublayers. Each of the overcoat layer, sublayers, and the base layer may have indicia printed thereon for communicating information.

U.S. Pat. No. 6,179,335 entitled Product Label Bearing an Instructional Booklet shows a folded booklet adhered to a portion of a label. A two part identifying and instructional booklet having a label part and a booklet part. The front of the label has a small unvarnished region. The booklet is folded and glued closed with the free edges secured interiorly. An adhesive is printed onto the unvarnished region of the label and the folded booklet is adhered to the unvarnished region. The booklet has a tab portion to facilitate opening of the book during use. The tab portion faces the identifying portion of the label which extends longitudinally outwardly from the unvarnished region. The label may be placed onto a cylindrical container and bent in the longitudinal direction whereby the spine and folds of the booklet remain straight, flat and parallel to each other.

U.S. Pat. No. 6,439,614 entitled Nested Leaflet Label Structure shows a booklet adhered to a label. A nested leaflet label structure includes a base panel having a front face. A first leaflet is adjacent to the front face and comprises a first folded panel having a first fold extending substantially parallel to the first axis of the label structure. The first fold divides the first folded panel into a pair of first leaves each having inner and outer page faces. A second leaflet comprises a second folded panel having a second fold extending substantially parallel to the first axis of the label structure. The second fold divides the second folded panel into a pair of second leaves each having inner and outer page faces. A laminating layer overlies the base panel and the first leaflet. The second leaflet is nested in the first leaflet. The second leaflet is adhered to the first leaflet.

Fold-out labels made from single sheets are shown in U.S. Pat. No. Re. 34,366. An example of a booklet which incorporates certain advantages of a label is disclosed in U.S. Pat. No. 5,324,559. The patent discloses a relatively simple booklet containing four sheets, i.e., eight pages. In all of these patents, the first page contains information which would otherwise be placed on the product label. The entire back page is adhered to the container leaving only the intermediate pages for instructional information. A further drawback of these patents lies in the fact that if their first page becomes detached from the booklet the product container would be unlabeled. U.S. Pat. No. 6,712,398 shows method for making removable inserts. U.S. Pat. No. 6,737,137 describes a method for manufacturing adhesive image transfer labels.

Accordingly, it would be desirable to provide an identifying and instructional document which combines the permanent nature of an adhesive label with the instructional capacity of a multi-page booklet.

SUMMARY OF THE INVENTION

Accordingly, it is an object of the present invention to provide booklets containing large amounts of information.

It is another object to provide methods for economically producing such booklets.

It is a further object to provide a book log where several booklets can be created in a multi-up format.

It is another object to join the book log to a web and progressively slit the web into multiple strips having booklets disposed along the length thereof.

According to a first embodiment of the invention, there is provided a method for manufacturing an instructional booklet mounted to a substrate. A multi-up book is provided having two or more booklets and a waste zone that share a common spine. The multi-up book is adhered to an overlaminate that is larger than the booklets. The overlaminate and multi-up book are progressively slit into two or more overlaminate strips having booklets secured thereto. The overlaminate strips are applied to a substrate, wherein the booklets are retained between the overlaminate strips and the substrate. The overlaminate comprises an overlaminate web traveling in a downstream direction D, and the adhering step further includes adhering a series of multi-up books spaced-apart along direction D of the overlaminate web, wherein said common spine is oriented perpendicular to the downstream direction D.

The overlaminate strip includes a series of spaced-apart booklets adhered thereto, wherein each overlaminate strip and the adhered booklets have the same width w measured perpendicular to direction D. Following said progressively slitting step, the method further includes severing the overlaminate strips along the downstream direction D to form individual overlaminate sections corresponding to each booklet. Each individual overlaminate sections have a length C that is greater than the booklet length b. The progressively slitting step includes progressively slitting with three or more blades that form a blade set, wherein each blade cuts deeper than the previous blade along the same line to form a single slit. The progressively slitting step includes wrapping the overlaminate partly around a cylindrical anvil and rotating the anvil to transport the multi-up book and overlaminate past the three or more blades that are increasingly closer to the anvil. The progressively slitting step separates the multi-up books and overlaminate web with two parallel slits to form a waste ribbon between said overlaminate strips, wherein said waste ribbon includes a series of spaced-apart adhered book waste zones from between each booklet. The progressively slitting step separates the multi-up books and overlaminate web with an additional parallel slit to form an additional waste ribbon along the edge of said overlaminate, wherein said additional waste ribbon includes a series of spaced-apart adhered book waste zones from the edge of the book.

Following the applying step, the method further includes die cutting the overlaminate strip and substrate into sections around the booklet while the booklet is contained within a deep cavity of the die during die cutting. The substrate includes a paper layer including a top surface devoid of adhesive, a bottom surface covered with adhesive, and a release liner that is adhered to the bottom surface. The die cutting step includes die cutting (i) the overlaminate strip into overlaminate sections and (ii) the paper layer into paper layer sections while avoiding cutting of the release liner to form an extended content booklet label. The overlaminate sections and the paper layer sections measured in direction D have the same length C which is greater than the booklet length b. The paper layer section has a width W that is greater than the common width w of the overlaminate strip and the adhered booklet. The method includes printing indicia on the paper layer, wherein said applying step includes applying the overlaminate strips to the substrate so that the booklets are in registration with the printed indicia.

Each overlaminate section hingedly attaches a corresponding booklet to the substrate, thereby forming an instructional booklet that folds away from the substrate, and wherein a lack of adhesive between the booklet and the substrate allows the substrate to bend without interference from the booklet. Following the die cutting step, the method further includes adhering the instructional booklet and paper layer to a container, wherein the substrate and booklet are free to shift and slide with respect to each other and without interference from the other due to the lack of adhesive binding them together. The multi-up book has free ends opposite the spine, wherein the free ends are folded twice over towards spine to enclose the free ends within the book. The three panels includes a first panel adjacent the free ends which is centrally located within the multi-up book, a second panel adjacent the spine, and a middle panel extending between the first and second panels. The middle panel is longer than the first panel and shorter than the second panel.

The first and middle panels form a ramp up on one side of the multi-up book leading to the central portion of the multi-up book which includes the first, second and middle panels. The second panel forms a ramp down on the other side of the multi-up book leading from the central portion of the multi-up book. The ramp up includes two panels, and wherein the central portion includes three panels, and wherein the ramp down includes one panel.

The multi-up book is selected from the group consisting of:

one sheet folded in half to form spine with front cover & back cover (4 pages);

one sheet folded in half, then cross folded to form spine with front & back cover (8 pgs.);

one sheet accordion folded then folded in half to form spine/front/back (12+ pages);

one sheet folded in half with additional pages adhered inside (6+ pages);

multiple sheets folded in half, and nested with spines adhered (8+ pages); and multiple sheets folded in half and stacked with spines adhered (perfect bound (8+ pgs).

BRIEF DESCRIPTION OF THE DRAWINGS

The advantages, nature, and various additional features of the invention will appear more fully upon consideration of the illustrative embodiments now to be described in detail in connection with accompanying drawings. In the drawings wherein like reference numerals denote similar components throughout the views:

FIGS. 10A, 10B and 10C are a series of side elevational views of the label applied to a bottle and shown in an open and closed configuration.

DETAILED DESCRIPTION OF THE PREFERRED EMBODIMENTS

Figure 1A:
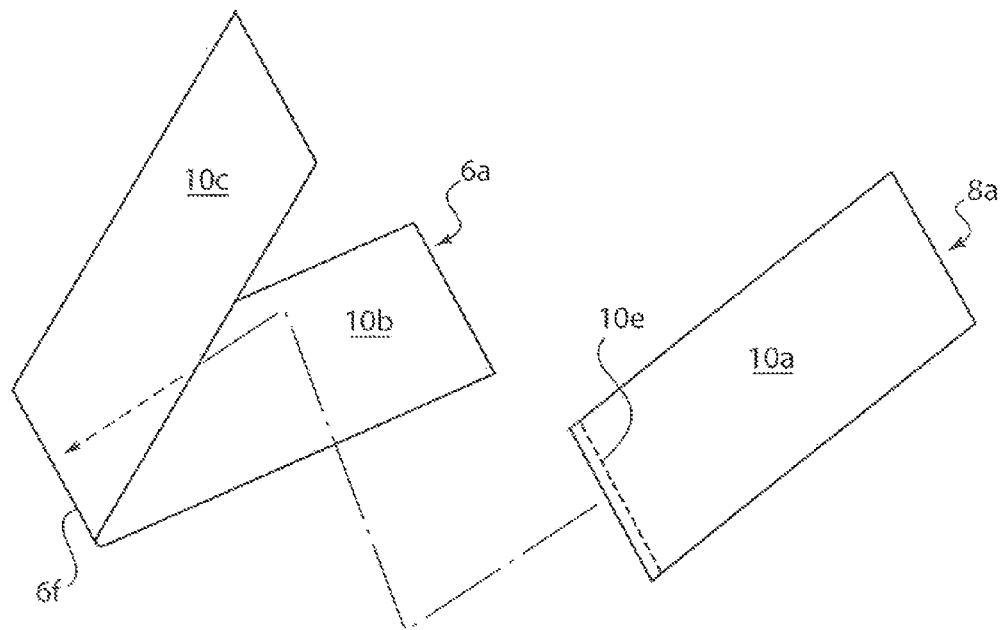
FIGS. 1A-1E are a series of views showing a first embodiment of a multi-up book used in the manufacturing method according to the invention.

In this application a "booklet" means an individual instructional piece having a cover sheet, a back sheet and at least one internal sheet. A sheet is a piece of paper having two opposed pages. The smallest booklet featuring one cover sheet (2 pages), one internal sheet (2 pages) and one back sheet (2 pages) would have a total of six pages. Additional internal sheets can be added. A booklet with two internal sheets would have a total of eight pages.

Booklets may be formed from one large sheet and one medium sheet by folding the large sheet in half and inserting the medium sheet into the fold. Such a booklet would have three sheets for a total of six pages.

The book may be formed by securing sheets and pages together at the binding by adhesive, glue or other suitable connection means. The book may have perforations at various locations on different sheets, to provide pages which can be removed from the book.

Booklets may be formed from one large sheet folded multiple times. The simplest example would be one sheet folded in half, and then folded in half again in a perpendicular direction. Such a booklet would have four sheets for a total of eight pages. The large sheet is bound together at the binding during the first folding step so that when the first fold is trimmed off the sheets remain connected together. Booklets with a greater number of sheets/pages may be provided by folding the large sheet additional times.

Booklets may be formed from two large sheets. The simplest example would be two sheets folded in half and then nested together with their fold lines bound together. Such a booklet would have 4 sheets and eight pages. Each additional large sheet added to the book would contribute another 2 sheets and 4 pages. Alternatively, the two large sheets can be folded in half and stacked together with the fold lines bound together to form a so called perfect bound booklet. Again, each additional large sheet added to the book would contribute another 2 sheets and 4 pages.

Booklets may be formed from large sheets that are folded end-over-end, for example folded end-over-end twice to form a ribbon that is three sheets thick. The ribbon in then folded in half perpendicular to the end-over-end folds. Binding adhesive may not be required. The end-over-end folds are then trimmed off to form a booklet with six sheets and twelve pages. If the original large sheet is folded end-over-end three times, the resulting booklet would have eight sheets and sixteen pages. Accordingly the final number of sheets can be calculated by taking the number of end-over-end folds, adding 1, and multiplying by 2. For 4 end-over-end folds, the resulting booklet would have 10 sheets, i.e. $(4+1)*2=10$.

Booklets may be formed from large sheets that are accordion folded, for example accordion folded twice to form a ribbon that is three sheets thick. The ribbon in then folded in half perpendicular to the accordion folds. Binding adhesive may not be required. The accordion folds are then trimmed off to form a booklet with six sheets and twelve pages. If the original large sheet is accordion folded three times, the resulting booklet would have eight sheets and sixteen pages. Accordingly the final number of sheets can be calculated by taking the number of accordion folds, adding 1, and multiplying by 2. For 4 accordion folds, the resulting booklet would have 10 sheets, i.e. $(4+1)*2=10$.

The large or medium sheets used to form the booklets are preprinted with indicia before folding. The layout of the printing is designed to provide text in a particular orientation on each page in the folded booklet. In a preferred embodiment, the indicia includes pharmaceutical information about drugs that are packaged with the booklets. The books can be printed by any suitable industrial printing process, for example sheet offset, web offset, flexographic, rotary letterpress, or gravure.

In this application the term "book" refers to a printed article having two or more booklets included therein. The booklets are linearly arranged with a common spine. In addition, a book includes a waste zone in between each adjacent pair of booklets. A book may include a top waste zone disposed above the top booklet. The top waste zone includes the upper edge of the book. The top waste zone may include free sheets and/or folds. A book may include a bottom waste zone disposed below the bottom booklet. The bottom waste zone includes the lower edge of the book. The bottom waste zone may include free sheets and/or folds. By cutting and removing the waste zone(s), the various booklets will be formed from the book. Cutting a top or bottom waste zone that includes folds, will allow the sheets of the resulting booklets to be opened.

The term "multi-up" refers to the orientation of the booklets within the book when the book is disposed onto the web or substrate. The web is a continuous substrate material that is typically wound off a roll and then passes through various manufacturing stations in a longitudinal direction. Therefore, longitudinal is the direction extending along the indefinite length of the web. The width across the web is a direction that is perpendicular to the longitudinal direction. When the book is placed on the web with the booklets oriented one below the other across the width, the book is considered to be multi-up. That is, a discrete longitudinal section of the web contains two or more booklets. A book having several multi-up booklets appears elongated and may be referred to as a "log" or "book log." These terms are equivalent to "multi-up book."

Figure 1B:
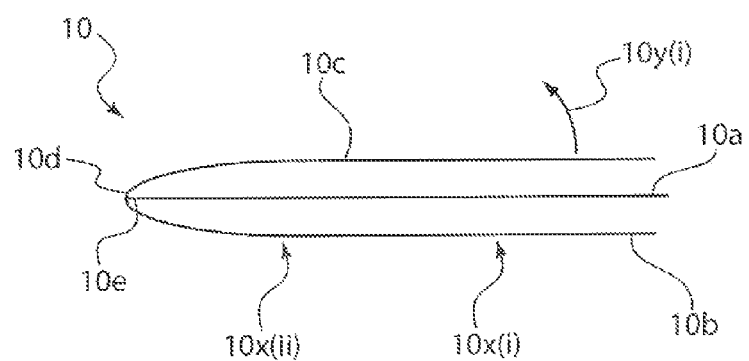

One form of a multi-up book 10 is illustrated in FIGS. 1A-1E. In the drawings, reference numerals having a 6 or 8 prefix, refer to sheets that are used to construct the book. Reference numerals with a 10 prefix refer to the completed book. Reference numerals with a 12 prefix refer to booklets, while reference numerals with a 14 prefix refer to the waste zones. FIG. 1A shows a large sheet 6a and a medium sheet 8a that are combined to form a book 10. Considering the final configuration of the book, sheets 6 and 8 are pre-printed with indicia to create properly oriented text and images for the various booklets that will be part of the multi-up book. Large sheet 6a is folded in half (or twice folded in thirds or additionally folded in other fraction) to form fold 6f. Glue 10e is applied to secure medium sheet 8a to the inside of fold 6f. The resulting book 10 is shown in FIG. 1B. The large sheet now forms cover sheet 10c and back sheet 10b. The medium sheet now forms internal sheet 10a. The resulting book has six pages: the front of cover sheet 10c, the back of cover sheet 10c, the front of internal sheet 10a, the back of internal sheet 10a, the front of back sheet 10b, and the back of back sheet 10b.

Glue for the spine of the books may be selected from various adhesives used in paper converting or corrugated applications that are approved for use in pharmaceutical packaging. Such adhesive may be water-based synthetic resins, for example, WB8147M available from H. B. Fuller of St. Paul, Minn.

The resulting book can be increased in size by adding sheets (to create two additional pages per sheet). For example, to increase to an 8 page book, large sheet 6a can be combined with a further large sheet. The two large sheets can be folded like sheet 6a and nested together with a line of glue at the fold line. Alternatively, the two large sheets can be placed on top of each other and glued together at the spine, in a perfect bound arrangement. To further increase the number of sheets, medium sheets can be added to form a 10 page book, for example. In this manner, books with increasing number of [paired] pages can be formed by combining 1, 2, 3 or more large sheets and 1 or more medium sheets. In lieu of two medium sheets, one could simply add a folded large sheet.

Figure 1C:
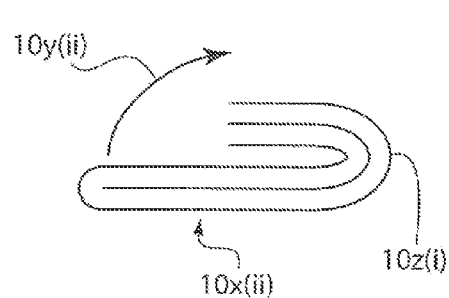
Figure 1D:
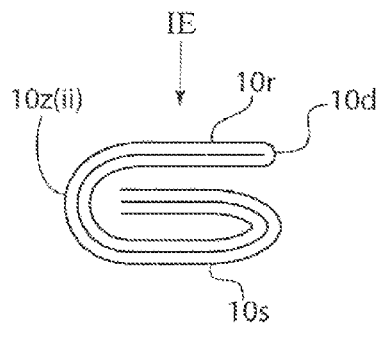

The book shown in FIG. 1B is fully assembled and as a multi-up book (or log) it contains two or booklets, each with a complete set of instructions or indicia. To prepare book 10 for use in the subsequent manufacturing steps, it is desirable to tuck in the free edges to streamline the book for further handling. Book 10 is divided into three sections with two fold locations designated as 10x(i) and 10x(ii). The arrow 10y(i) indicates the fold direction as the book is initially folded at first fold location 10x(i). FIG. 1C shows the resulting configuration with a completed first fold 10z(i). The arrow 10y(ii) indicates the fold direction as the book is subsequently folded at second fold location 10x(ii). FIG. 1D shows the resulting configuration with a completed second fold 10z(ii). Note the free ends of the sheets are tucked inside the book so as to avoid interference with the processing and handling equipment. As will be explained in greater detail below, the folded book 10 includes an upper surface 10r that will be adhered to the overlaminate, and a lower surface 10s that will be placed on the web and selectively adhered thereto.

Figure 1E:
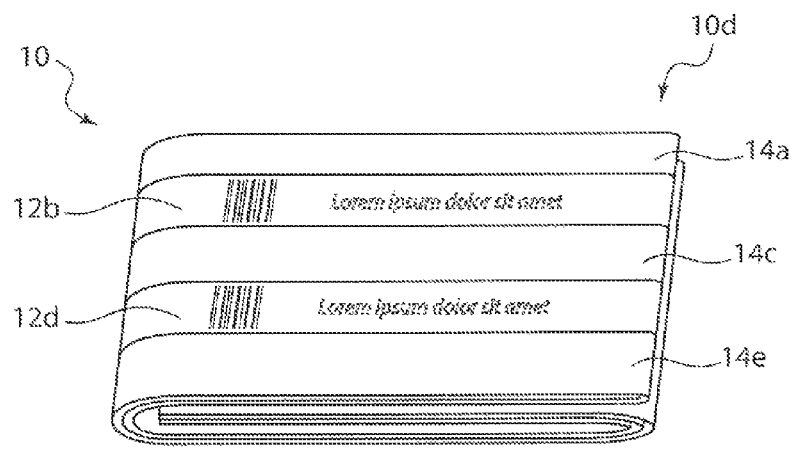

Referring to a top view of the folded book, FIG. 1E shows book 10 with two booklets 12b, 12d alternating with a top waste zone 14a, a waste zone 14c and a bottom waste zone 14e.

The books are made from paper referred to as offset stock having a paper weight between 22# and 60#. The # designation is a measure of paper density measured in pounds per basis ream of 500 sheets of 17" by 22" paper. Such paper may be obtained from Twin Rivers Paper Company of South Portland, Me. or Finch Paper, LLC of Glen Falls, N.Y. For example Twin Rivers supplies 22# Custom Plus and 27#, 30#, 35#, 40# Pharmopaque—Regular Finish. Finch supplies 40# Finch Opaque—Wove Finish and 60# Finch Opaque—Vellum Finish. The preferred paper is Twin Rivers 27# Pharmopaque—Regular Finish.

Figure 2A:
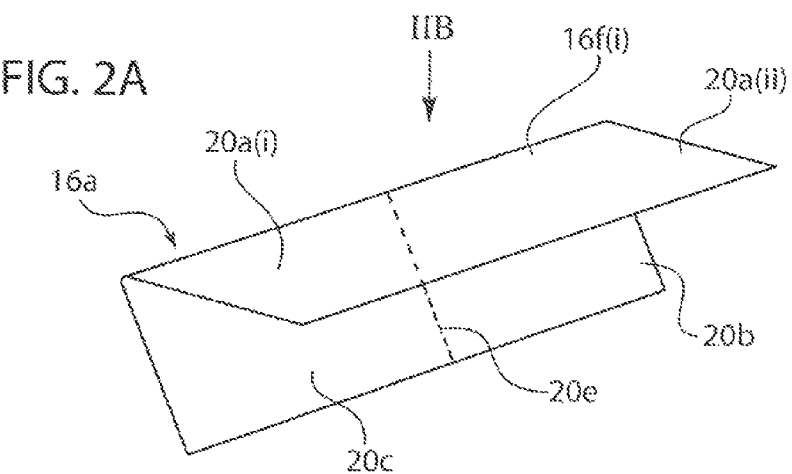
FIGS. 2A-2F are a series of views showing a second embodiment of a multi-up book used in the manufacturing method according to the invention.
Figure 2B:
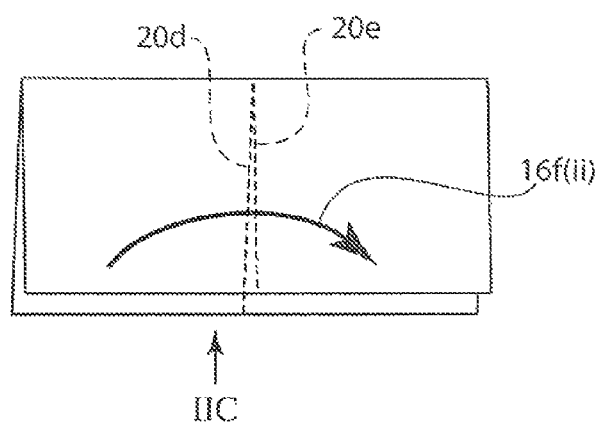

Another form of a multi-up book 20 having 4 sheets and 8 pages made from a single large sheet 16 is shown in FIGS. 2A-2F. In these drawings, reference numerals having a 16 prefix, refer to sheet(s) that are used to construct the book. Reference numerals with a 20 prefix refer to the completed book. Reference numerals with a 22 prefix refer to booklets, while reference numerals with a 24 prefix refer to the waste zones. FIG. 2A shows a large sheet 16a pre-printed with indicia to create properly oriented text and images for the various booklets that will be part of the multi-up book. Large sheet 16a is folded in half to form fold 16f(i). Glue 20e is applied to secure two linear sections of the folded sheet 16a together. As can be most easily seen in FIGS. 2B and 2C, the glue line 20e will form the spine 20d of the book. The sheet is then folded in half again as indicated by arrow 16f(ii). When the two folds are completed, the large sheet 16a forms cover sheet 20c, internal sheets 20a(i) and 20a(ii), and back sheet 20b. The resulting book has eight pages: the front & back of cover sheet 20c, the front and & back of internal sheet 20a(i), the front and back of internal sheet 20a(ii), and the front and back of back sheet 20b.

The resulting book can be increased in size by adding sheets. For example, another one or more large sheet(s) like 16a can be folded and nested within large sheet 16a and/or laid on top of 16a. Using two large sheets like 16a would provide a book with 8 sheets and 16 pages. Alternatively, a medium sheet which is half the size of large sheet 16a can be tucked into the fold and adhered top and bottom with a pair of glue lines similar to 20e. One large sheet and one medium sheet would provide a book with 6 sheets and 12 pages. In this manner, books with increasing number of [paired] pages can be formed by combining 1, 2, 3 or more large sheets and 1 or more medium sheets. In lieu of two medium sheets, one could simply add a folded large sheet.

Figure 2C:
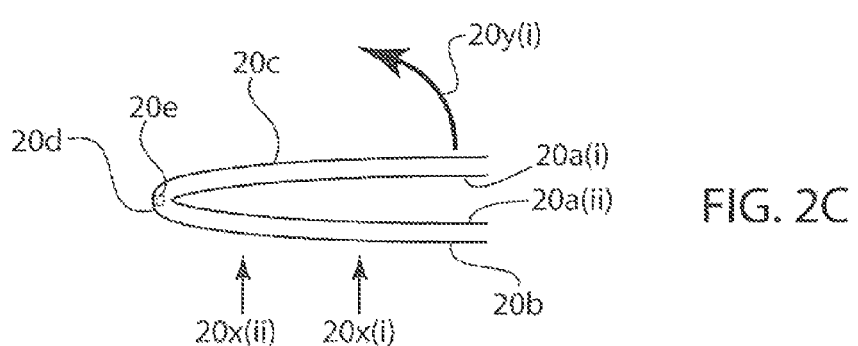
Figure 2D:
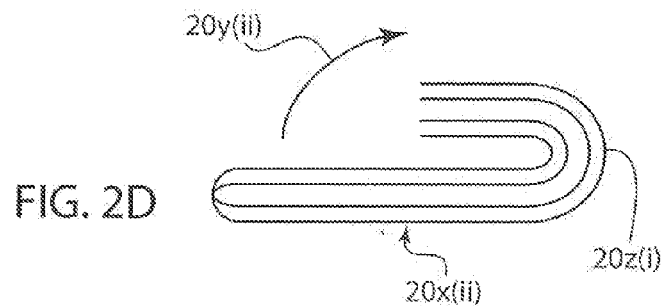
Figure 2E:
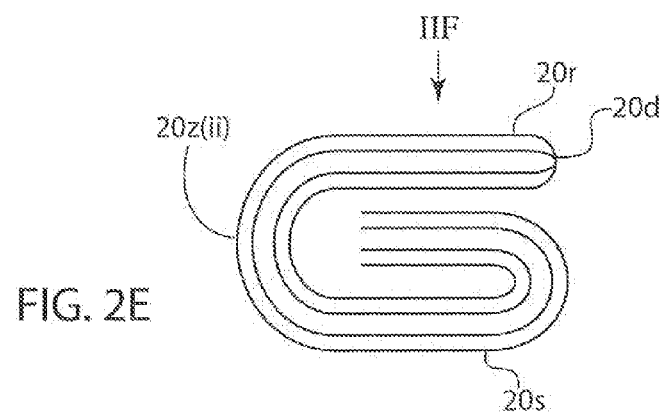

The book shown in FIG. 2C is fully assembled and as a multi-up book it contains two or booklets, each with a complete set of instructions or indicia. In a subsequent step, the top fold 16f(i) will be trimmed off to allow the pages of book 20 to open and separate from each other. To prepare book 20 for use in the subsequent manufacturing steps, it is desirable to tuck in the free edges to streamline the book for further handling. Book 20 is divided into three sections with two fold locations designated as 20x(i) and 20x(ii). The arrow 20y(i) indicates the fold direction as the book is initially folded at first fold location 20x(i). FIG. 2D shows the resulting configuration with a completed first fold 20z(i). The arrow 20y(ii) indicates the fold direction as the book is subsequently folded at second fold location 20x(ii). FIG. 2E shows the resulting configuration with a completed second fold 20z(ii). Note the free ends of the sheets are tucked inside the book so as to avoid interference with the processing and handling equipment. As will be explained in greater detail below, the folded book 20 includes an upper surface 20r that will be adhered to the overlaminate, and a lower surface 20s that will be placed on the web and be selectively adhered thereto.

Figure 2F:
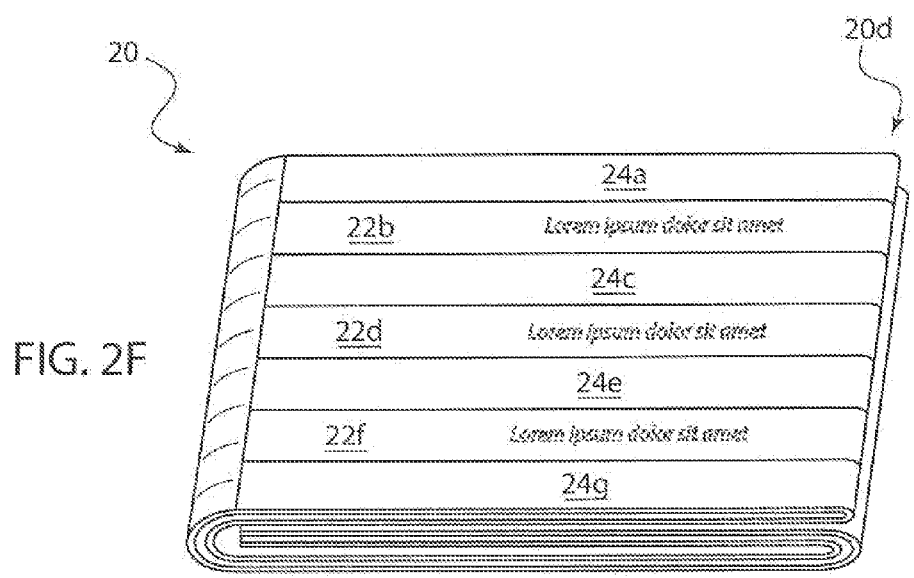

Referring to a top view of the folded book, FIG. 2F shows book 20 with three booklets 22b, 22d, 22f alternating with a top waste zone 24a, intermediate waste zones 24c, 24e and a bottom waste zone 24g. As mentioned earlier, top waste zone 24a contains fold 16f(i) and will be trimmed off.

Figure 3A:
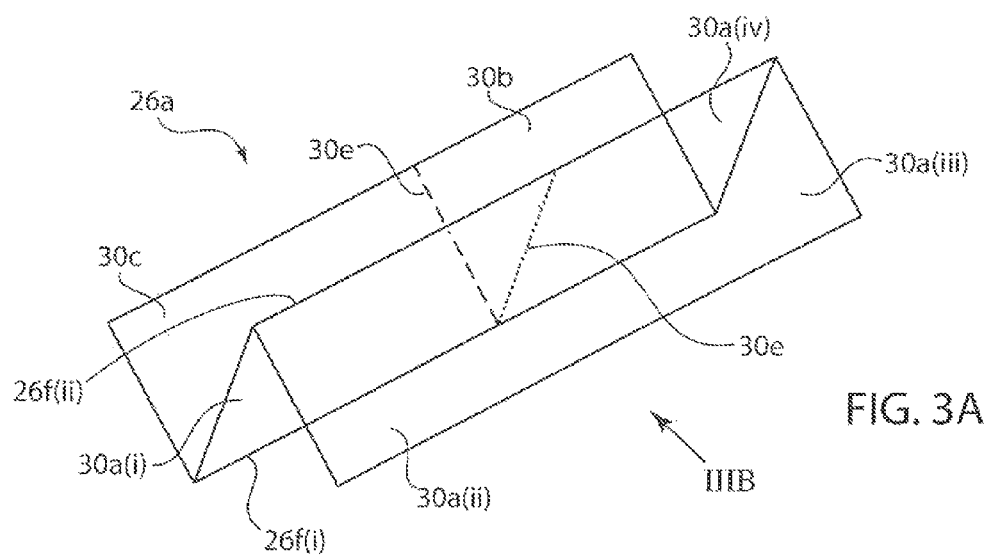
FIGS. 3A-3F are a series of views showing a third embodiment of a multi-up book used in the manufacturing method according to the invention.
Figure 3B:
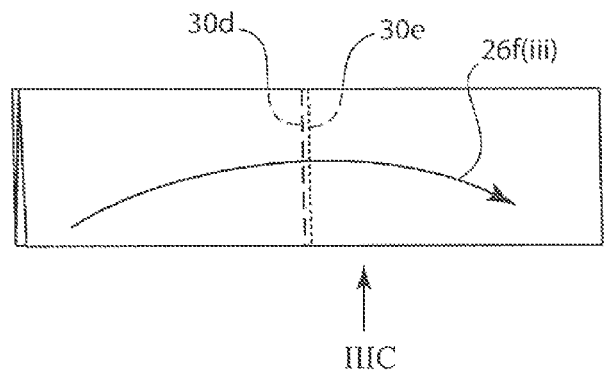

Another form of a multi-up book 30 having 6 sheets and 12 pages made from a single large sheet 26 is shown in FIGS. 3A-2F. In these drawings, reference numerals having a 26 prefix, refer to sheet(s) that are used to construct the book. Reference numerals with a 30 prefix refer to the completed book. Reference numerals with a 32 prefix refer to booklets, while reference numerals with a 34 prefix refer to the waste zones. FIG. 3A shows a large sheet 26a pre-printed with indicia to create properly oriented text and images for the various booklets that will be part of the multi-up book. Large sheet 26 is accordion folded twice in thirds to form folds 26f(i) and 26f(ii). Glue 30e is applied within both folds. Each glue line secures two linear sections of the accordion folded sheet 26 together. As can be most easily seen in FIGS. 3B and 3C, the glue line 30e will form the spine 30d of the book. The sheet is then folded in half again as indicated by arrow 26f(iii). When the three folds are completed, the large sheet 26 forms cover sheet 30c, internal sheets 30a(i) and 30a(ii) and 30a (iii) and 30a(iv), and back sheet 30b. The resulting book has twelve pages: the front & back of cover sheet 30c, the front and & back of internal sheets 30a(i) through 30a(iv), and the front and back of back sheet 30b.

The resulting book can be increased in size by adding folds. For example, another one or a larger sheet like 26 can be accordion folded three or more times to produce four or more panels, respectively. That is the total number of folds of form 26f(i), can be represented by ii, iii, iv . . . n. Where the number of panels would be represented by 3, 4, 5 . . . n+1.

In this manner, books with increasing number of [paired] pages can be formed by an increasing number of accordion folds.

Figure 3C:
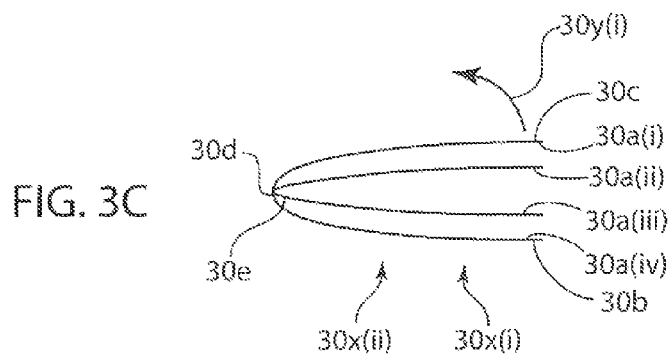
Figure 3D:
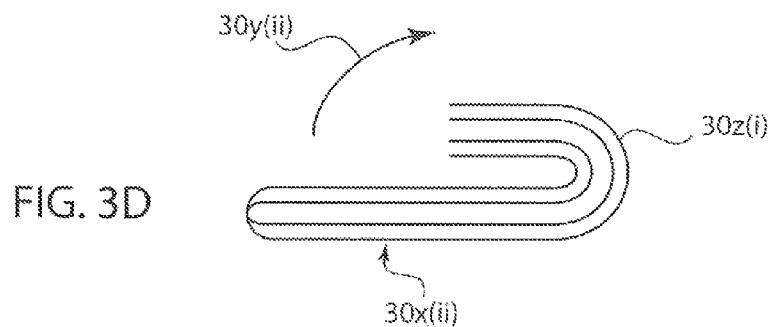
Figure 3E:
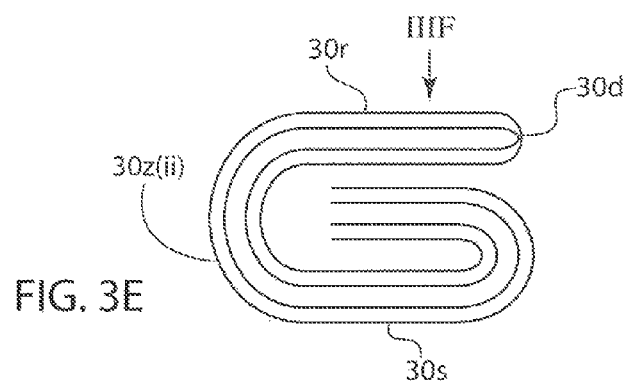

The book shown in FIG. 3C is fully assembled and as a multi-up book it contains two or booklets, each with a complete set of instructions or indicia. In a subsequent step, the top fold 26f(ii) will be trimmed off to allow the pages of book 30 to open and separate from each other. If additional folds are present along the top edge of book 30, they will likewise be trimmed off. Similarly, the bottom fold 26f(i) will be trimmed off along with any additional folds present at the bottom edge of book 30. To prepare book 30 for use in the subsequent manufacturing steps, it is desirable to tuck in the free edges to streamline the book for further handling. Book 30 is divided into three sections with two fold locations designated as 30x(i) and 30x(ii). The arrow 30y(i) indicates the fold direction as the book is initially folded at first fold location 30x(i). FIG. 3D shows the resulting configuration with a completed first fold 30z(i). The arrow 30y(ii) indicates the fold direction as the book is subsequently folded at second fold location 30x(ii). FIG. 3E shows the resulting configuration with a completed second fold 30z(ii). Note the free ends of the sheets are tucked inside the book so as to avoid interference with the processing and handling equipment. As will be explained in greater detail below, the folded book 30 includes an upper surface 30r that will be adhered to the overlaminate, and a lower surface 30s that will be placed on the web and be selectively adhered thereto.

Figure 3F:
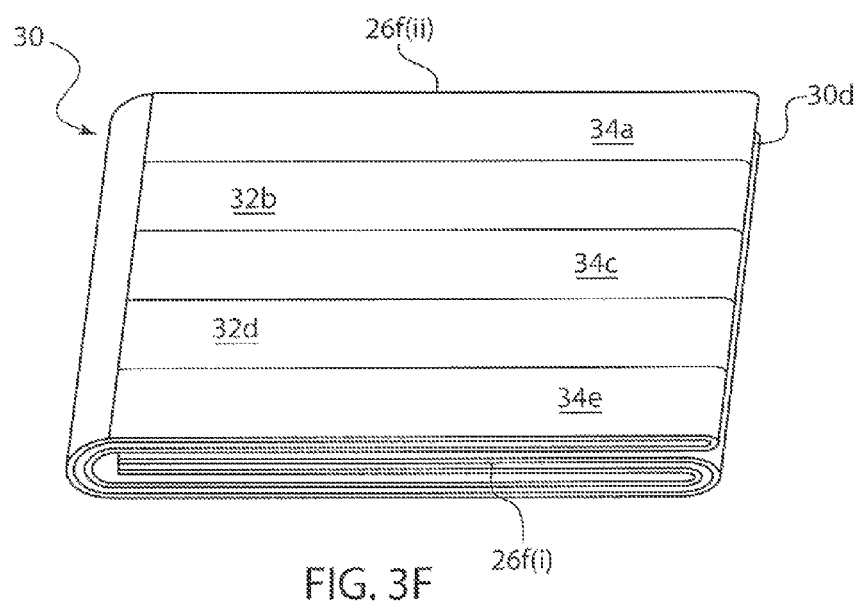

Referring to a top view of the folded book, FIG. 3F shows book 30 with two booklets 32b, 32d alternating with a top waste zone 34a, an intermediate waste zone 34c, and a bottom waste zone 34g. As mentioned earlier, top waste zone 34a contains fold 26f(ii) and will be trimmed off. Bottom waste zone 34e contains fold 26f(i) and will be trimmed off.

Figure 4A:
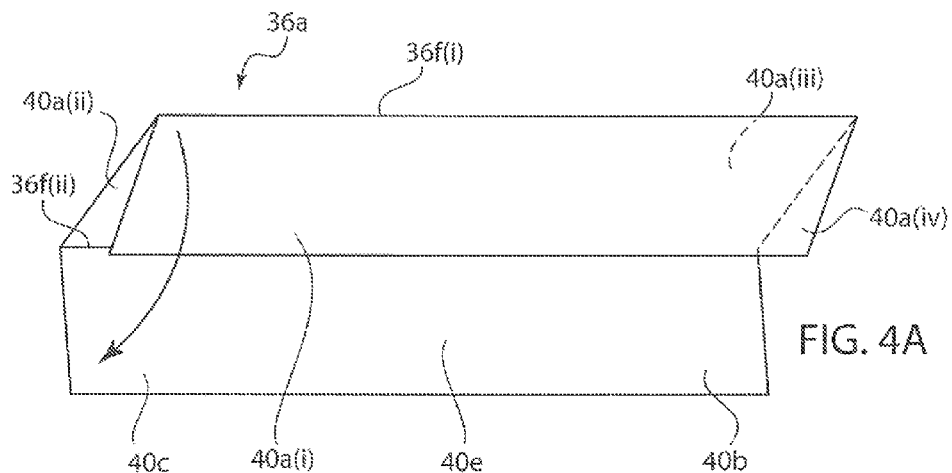
FIGS. 4A-4G are a series of views showing a fourth embodiment of a multi-up book used in the manufacturing method according to the invention.
Figure 4B:
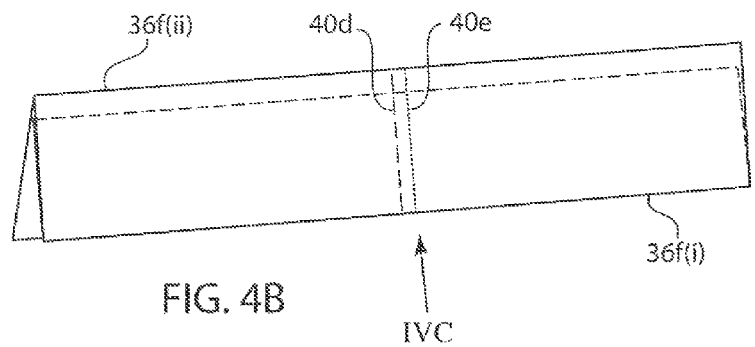
Figure 4C:
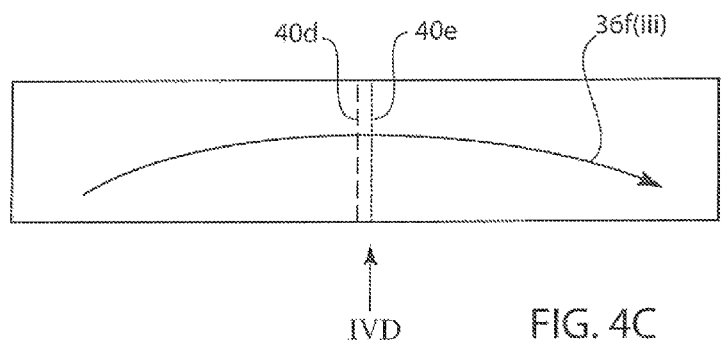

Another form of a multi-up book 40 having 6 sheets and 12 pages made from a single large sheet 36a is shown in FIGS. 4A-4G. In these drawings, reference numerals having a 36 prefix, refer to sheet(s) that are used to construct the book. Reference numerals with a 40 prefix refer to the completed book. Reference numerals with a 42 prefix refer to booklets, while reference numerals with a 44 prefix refer to the waste zones. FIG. 4A shows a large sheet 36a pre-printed with indicia to create properly oriented text and images for the various booklets that will be part of the multi-up book. Large sheet 36a is folded end-over-end twice in thirds to form folds 36f(i) and 36f(ii). Glue 40e is applied within both folds. For example, glue is applied in a line down the center of large sheet 36a perpendicular to the folds 36f. The glue line secures two linear sections of the end-over-end folded sheet 36a together. As can be most easily seen in FIGS. 4B, 4C and 4D, the glue line 40e will form the spine 40d of the book. The sheet is then folded in half as indicated by arrow 36f(iii). Glue line 40e is disposed co-linear to the final fold 36f(iii) which cooperatively form spine 40d. When the three folds are completed, the large sheet 26 forms cover sheet 40c, internal sheets 40a(i) and 40a(ii) and 40a (iii) and 40a(iv), and back sheet 40b. The resulting book has twelve pages: the front & back of cover sheet 40c, the front and & back of internal sheets 40a(i) through 40a(iv), and the front and back of back sheet 40b.

The resulting book can be increased in size by adding folds. For example, another one or a larger sheet like 36a can be folded end-over-end three or more times to produce four or more panels, respectively. That is the total number of folds of form 36f(i), can be represented by ii, iii, iv . . . n. Where the number of panels can be calculated as a function of folds as ii+1, iii+1, iv+1 resulting in the number of panels being 3, 4, 5 . . . n+1. In this manner, books with increasing number of [paired] pages can be formed by an increasing number of end-over-end folds.

Figure 4D:
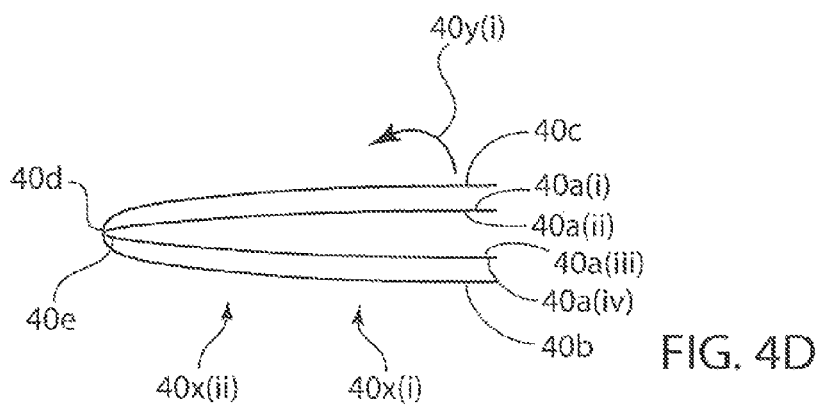
Figure 4E:
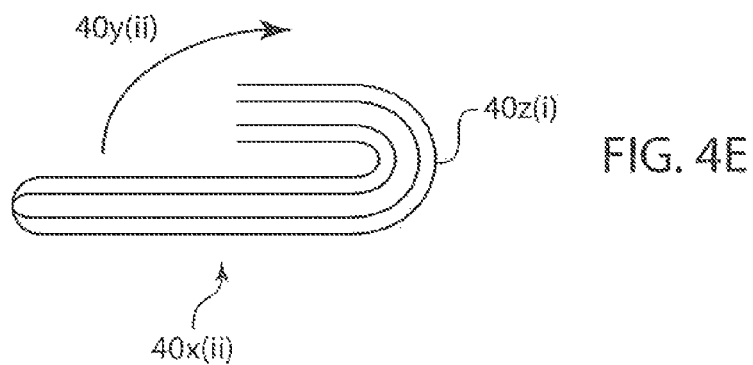
Figure 4F:
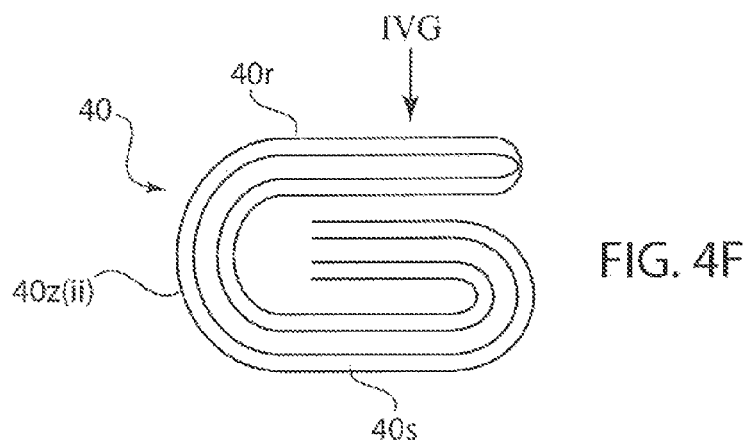

The book shown in FIG. 4D is fully assembled and as a multi-up book it contains two or more booklets, each with a complete set of instructions or indicia. In a subsequent step, the top fold 36f(ii) will be trimmed off to allow the pages of book 40 to open and separate from each other. If additional folds are present along the top edge of book 40, they will likewise be trimmed off. Similarly, the bottom fold 36f(i) will be trimmed off along with any additional folds present at the bottom edge of book 30. To prepare book 40 for use in the subsequent manufacturing steps, it is desirable to tuck in the free edges to streamline the book for further handling. Book 40 is divided into three sections with two fold locations designated as 40x(i) and 40x(ii). The arrow 40y(i) indicates the fold direction as the book is initially folded at first fold location 40x(i). FIG. 4E shows the resulting configuration with a completed first fold 40z(i). The arrow 40y(ii) indicates the fold direction as the book is subsequently folded at second fold location 40x(ii). FIG. 4F shows the resulting configuration with a completed second fold 40z(ii). Note the free ends of the sheets (which are opposite spine 40d as shown in FIG. 4D) are tucked inside the book so as to avoid interference with the processing and handling equipment. As will be explained in greater detail below, the folded book 40 includes an upper surface 40r that will be adhered to the overlaminate, and a lower surface 40s that will be placed on the web and remain unadhered thereto.

Figure 4G:
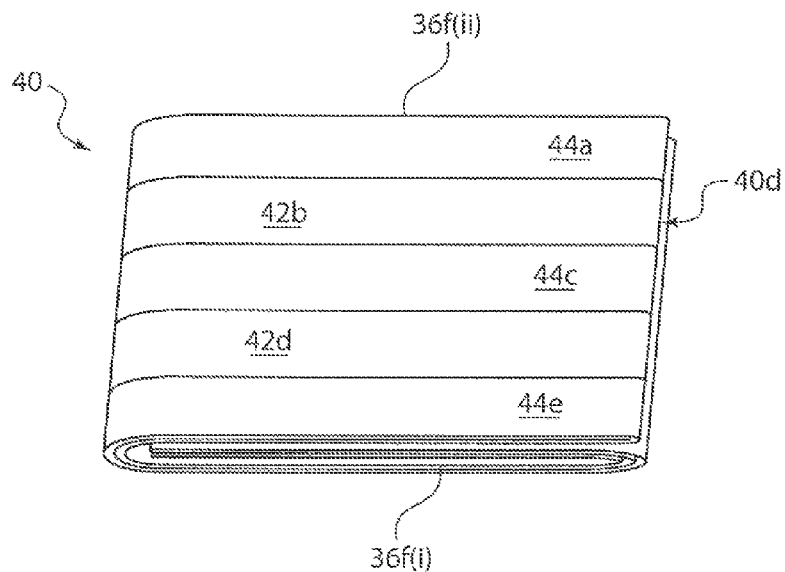

Referring to a top view of the folded book, FIG. 4G shows book 40 with two booklets 42b, 42d alternating with a top waste zone 44a, an intermediate waste zone 44c, and a bottom waste zone 44e. As mentioned earlier, top waste zone 44a contains fold 36f(ii) and will be trimmed off. If additional top folds are present, they will be trimmed off also. Bottom waste zone 44e contains fold 36f(i) and will be trimmed off. If additional bottom folds are present, they will be trimmed off also.

Figure 5:
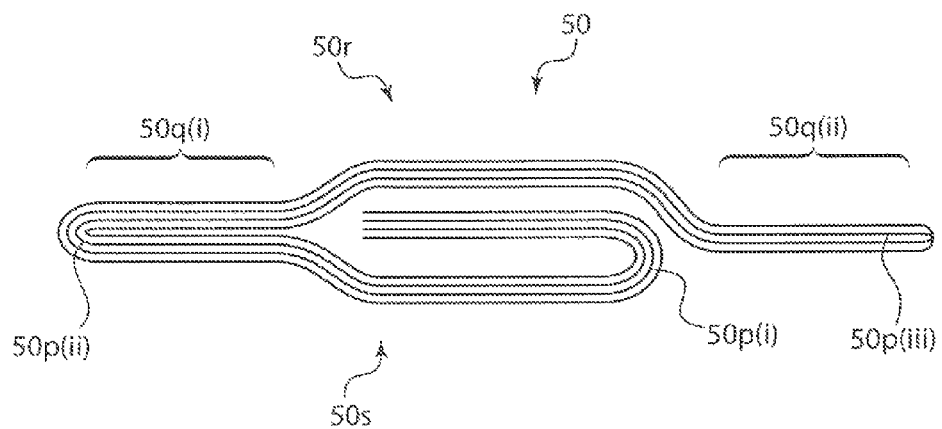
FIG. 5 is a side elevational view showing a fifth embodiment of a folded book used in the manufacturing method according to the invention.

As discussed above, FIG. 4F shows a multi-up book that is bi-folded in equal thirds to form folded book 40. An alternative configuration is shown in FIG. 5, where the multi-up book is twice folded in unequal sections to form folded book 50. Folded book 50 shows a ramp-up section 50q(i) of double thickness, a center section of triple thickness, and a ramp-down section 50q(ii) of single thickness. The ramp-up and ramp-down sections are useful in certain applications, for example with thicker books. All of the multi-up books described in this application can be folded to include the ramp-up and/or ramp-down sections. As used herein, a ramp section means a section having fewer than all panels present. The ramp sections are located at the leading or trailing edges of the multi-up book. As will be described in greater detail below, the lower section 50s will be placed on the web and remain unadhered, while the upper section 50r will be adhered to the overlaminate. The ramp sections will allow the overlaminate to layer onto the book and web with a smoother transition. That is, the overlaminate can transition off the web to a double thickness, before accommodating the triple thickness. The overlaminate can then transition to a single thickness before re-attaching to the web. As can be seen in FIG. 4F, if book 40 is very thick, gaps may form on either side as the overlaminate transitions from the web to triple thickness and then back down to the web.

Referring back to FIG. 5, the upper surface 50r will be adhered to the overlaminate, with all other sheets being free from the overlaminate. The book may be formed with perforation, for example, perforations running in the sheets parallel to the spine of the book. When the booklet is opened, perforation 50p(i) would allow about ⅙ of the sheet to be removed. Such perforations can be included on one or more sheets at similar or different locations. Other perforations 50p(ii) allow about a half sheet to be removed. Where perforation 50p(iii) would allow about 1 full sheet to be removed. The sheet portions that are removed could include coupons, receipts for pharmacists, hand-outs for patients, or other printed or machine-scannable documents. Each booklet could have multiple perforations on one sheet, or several perforations on different sheets. The hand-outs could be similar to each other or different. As can be appreciated, the original large sheets 6a, 16a, 26a, 36a and the medium sheets 8a can be preprinted and perforated to provide indicia and hand-outs in certain orientations and configurations within the individual booklets.

Figure 6:
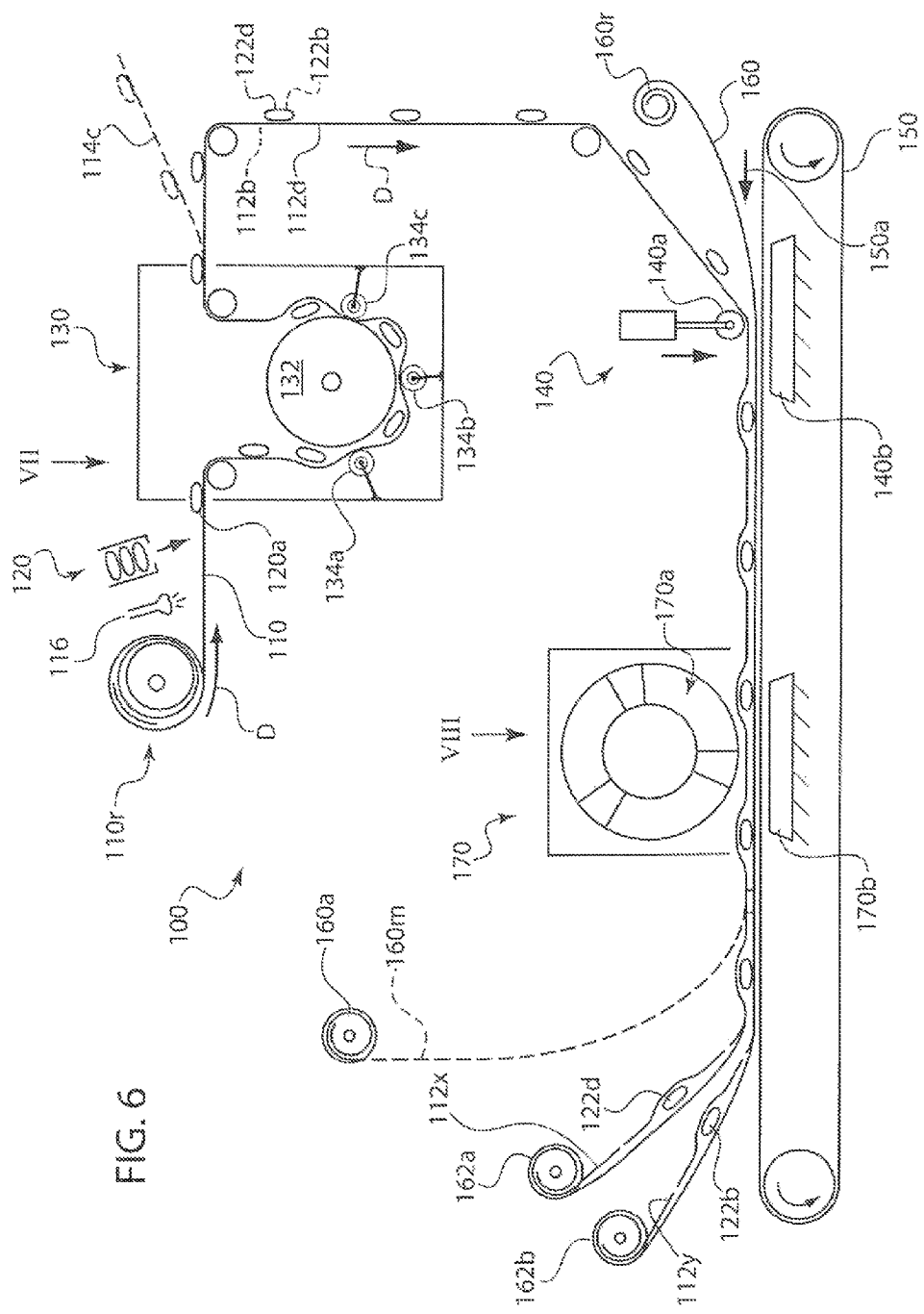
FIG. 6 is a schematic side elevational view of processing stations that are used in the manufacturing method according to the invention.

The manufacturing method according to the invention will now be described in reference to the schematic in FIG. 6 which shows a side elevational view of processing equipment having various stations used to separate multi-up book logs into individual booklets that are mounted between an overlaminate and a substrate. As an overview, multi-up book logs are joined to an overlaminate which is slit into over- laminate strips bearing booklets. The overlaminate strips are adhered to a substrate with a booklet sandwiched therebetween. The overlaminate strip and substrate are then die cut into sections that are larger than the booklet in at least one dimension. The die includes a deep cavity in which the booklet will reside while the die cuts the overlaminate and substrate into individual sections corresponding to each booklet. The completed product features the booklet sandwiched between the corresponding overlaminate and substrate sections.

By way of summarizing the processing stations, the processing equipment 100 includes a book log feeder 120 to dispense multi-up book logs 120a on to the adhesive side of an overlaminate 110. A progressive slitter 130 slices through the logs and overlaminate to form overlaminate strips 112b, 112d bearing booklets 122b, 122d. At laminating station 140 the overlaminate strips are adhered to a substrate 160 with the booklets sandwiched therebetween. The overlaminate strip and substrate are then trimmed to their final usable size at die cutting station 170. Since the booklets were trimmed to their final size by the progressive slitter, they do not need any further trimming in the die cutting station.

The book log feeder 120 dispenses multi-up books or logs 120a to adhere to overlaminate 110. The logs 120a may be any one of the multi-up books 10, 20, 30, 40 or 50 shown in FIGS. 1-5, or their extended or varied versions described in the corresponding detailed description. FIG. 6 illustrates a book log having two booklets and a waste zone in between. This would correspond, for example, to booklet 10 having three sections, namely booklet 12b, waste zone 14c and booklet 12d. Overlaminate 110 and the series of spaced logs 120a are then fed to the progressive slitter 130. More particularly, an overlaminate web 110 feeds off an overlaminate web roll 110r in a downstream direction D. The overlaminate is a thin film that has adhesive on one side and a protective release liner covering the adhesive. The surface with adhesive faces the book log feeder 120, which would be the upper surface in the figure. The release liner, which is omitted for the sake of clarity, is peeled away and discarded as the laminate dispenses off the web roll 110r. The overlaminate may be interchangeably referred to simple as a laminate, i.e. a laminate that is applied over another material.

The laminate may be opaque, translucent or transparent. The laminate may be pre-printed with indicia. In such a case, the book logs would need to be applied to the overlaminate in registration. A sensor 116 senses the location and speed of the indicia and sends a signal to book log feeder 120 to trigger the feeding of book logs 120a so they are disposed on to the laminate in a proper location with respect to the indicia. In this manner, the speed of the moving web is accommodated and book logs are always placed in their proper location on the laminate. In another embodiment the laminate is transparent without indicia so that any printing on the lower facing surface of the book can be seen through the laminate. With non-printed laminate, the book logs can simply be dispensed at regular intervals along the laminate web. In addition to printing indicia, or in place of printing indicia, the overlaminate may be printed with adhesive deadener. The adhesive deadener may be applied in stripes to reduce the adhesive strength or in blocks to eliminate adhesive in selected areas. For example, it may be desirable to reduce the adhesive strength at overlaminate tab 118, as shown in FIG. 10A, or eliminate adhesive at one corner of the tab. This would make the corner more accessible, and allow the tab to peel from the substrate easier.

Suitable laminate includes facestock between 0.8 to 1 mil thick coated with adhesive disposed on a liner. Suitable laminates are available from Avery Dennison sold under the tradename Fasson®. For example, Avery Dennison supplies 0.8 mil polypropylene facestock coated with clear, permanent acrylic adhesive; and 1 mil clear printed—treated polyester coated with S8020 clear, permanent acrylic adhesive disposed on 40# bleached white glassine liner. The preferred laminate is the latter 1 mil clear printed—treated polyester coated with S8020 clear, permanent acrylic adhesive disposed on 40# bleached white glassine liner.

The laminate 110 with book logs 120a adhered at regular intervals then enters the progressive slitter 130. The laminate wraps around an anvil 132 and is rotated past a set of slitting blades. Typically, three or more slitting blades are employed in each set. In the figure, three blades are shown for the sake of clarity. The first slitting blade 134a is spaced from the anvil and makes a slit through the laminate and several layers of the book log. The second slitting blade 134b is set closer to the anvil and slits the next several layers of the book log. The third and final blade 134c is in contact with the anvil and completely slits through the book log. The blades within the set are aligned to collectively form one slit completely through the book/laminate web.

In the simplest form, there is one set of blades that form a single slit, resulting in two laminate strips 112b and 112d. In this scenario, there is no waste ribbon 114c. The laminate strips would then be separated from each other as they travel from slitting station 130 to laminating station 140, and then adhered to substrate 160 with predetermined spacing therebetween. More than two overlaminate strips may be created, for example by providing additional blade sets. All overlaminate strips may be adhered to a single substrate. Each overlaminate strip may be adhered to its own substrate.

In another embodiment, there are two sets of blades that form two slits, resulting in three web sections. The second set of blades would reside directly behind the first set of blades shown in FIG. 6. The first web section is an overlaminate strip 112b. the middle a waste ribbon 114c, and the third an overlaminate strip 112d. As can be seen in the upper right hand corner of the figure, the middle waste ribbon 114c shown in dotted line is being removed from the process. The two overlaminate strips 112b and 112d then proceed in downstream direction D to the laminating station 140. The overlaminate strips are adhered to substrate 160 at spacing equal to the width of waste ribbon 114a. This is equivalent to the spacing between the blade sets.

Figure 7:
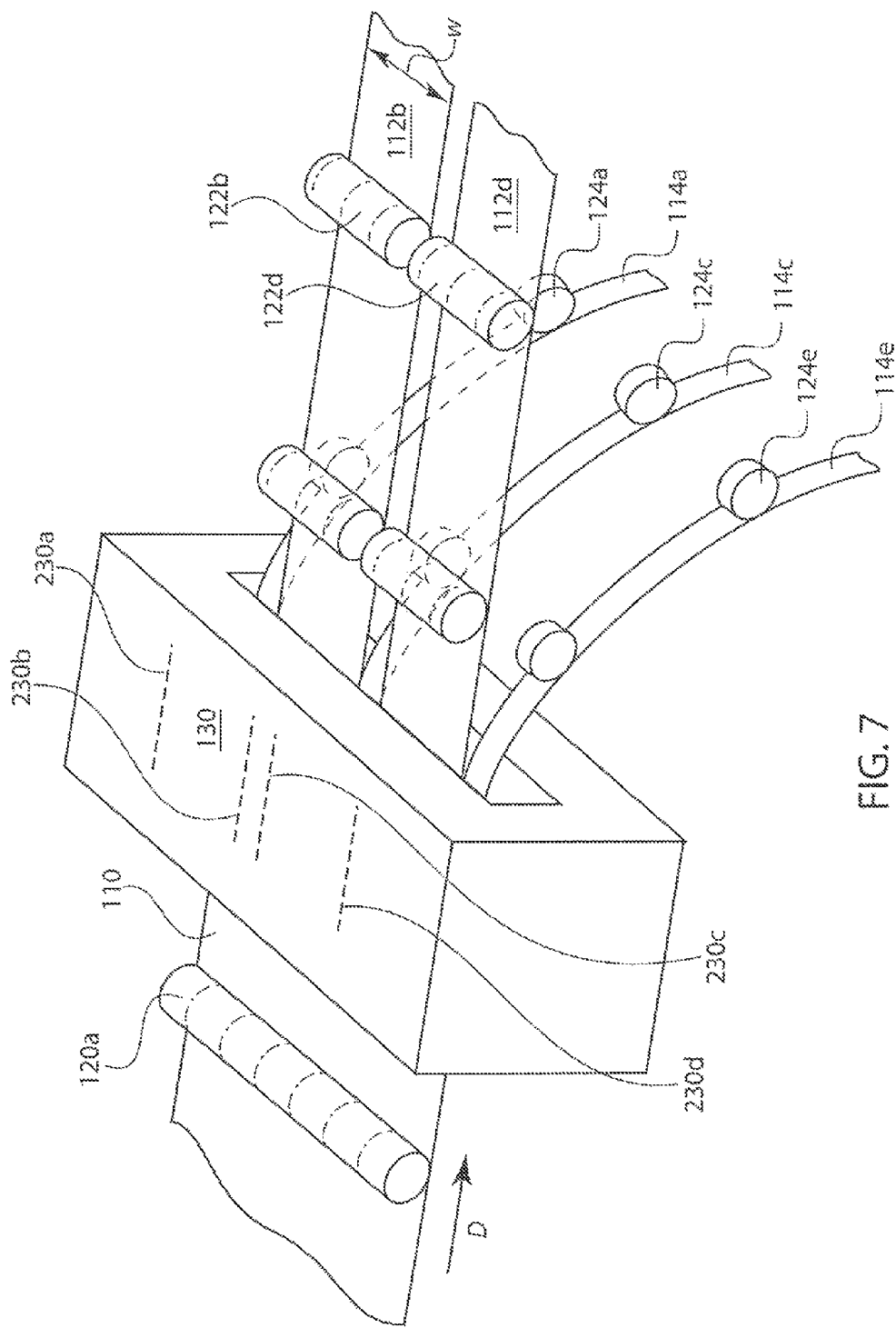
FIG. 7 is a schematic perspective view of the progressive slitting station.

FIG. 7 shows a perspective view of progressive slitting station 130 where a log 120a is adhered to a laminate 110 and feeds into the progressive slitter in the downstream direction D. While FIG. 6 schematically shows one or two blade sets, FIG. 7 shows four blade sets to illustrate that any number of blade sets can be provided. Parallel to the downstream direction there are arranged four sets 230a, 230b, 230c, 230d of slitting blades. Each set consists of three or more slitting blades, as in slitting blades 134a, 134b and 134c. Each blade set forms one slit along the length of the overlaminate web 110. From the top of the page down, the single overlaminate web is now slit into 5 parts, namely: a waste ribbon 114a, an overlaminate strip 112b, a waste ribbon 114c, an overlaminate strip 112d and a waste ribbon 114e. At the same time, the log 120a has been slit into 5 parts, namely: a waste zone 124a, a booklet 122b, a waste zone 124c, a booklet 122d and a waste zone 124e. As shown, waste zones 124a, 124c, 124e from the log are adhered to waste ribbons 114a, 114c, 114e from the overlaminate, respectively. These waste zones and waste ribbons are removed and discarded or recycled. The waste zones from the book may also be seen in FIG. 1E as waste zones 14a, 14c and 14e. Two or more overlaminate strips, and at least one waste ribbon are formed as the overlaminate exits the progressive slitter 130. The overlaminate strips are parallel and extending along the longitudinal dimension of the web in direction D.

Referring back to FIG. 6, the overlaminate strips then proceed in a downstream direction D to laminating station 140 where they are adhered to a substrate. Substrate 160 may be preprinted. Alternatively, substrate 160 may be printed on its way to laminating station. Another option includes applying adhesive to laminate just prior to reaching laminating station. Is substrate 160 is provided with printing or adhesive, a sensor would monitor the position of such printing or adhesive and adjust the relative speed of laminate 110 to insure that the booklets are laminated to the substrate in registration with the printing or adhesive. Adhesive or glue used to secure the books to the substrate may be selected from various adhesives used in paper converting applications that are approved for use in pharmaceutical packaging. Such adhesive may be permanent acrylic adhesive, for example, clear, permanent acrylic adhesive S8020 available from Avery Dennison sold under the tradename Fasson®.

Substrate material may be chosen from various paper or label stock. For example, overlaminate strips may be adhered to a paper web, which is subsequently coated with adhesive on its underside to form a label. In a preferred embodiment, substrate 160 is label stock comprising a release liner 166, and a paper layer 164 coated with adhesive 164a. The release liner is a polypropylene substrate having a thickness between 0.5 mil and 4.5 mils.

Suitable labels include those having between 54# to 60# facestock. Such label stock is available from Avery Dennison sold under the tradename Fasson®. For example, Avery Dennison supplies 54# semi-gloss facestock (paper) coated with C2500 rubber based adhesive disposed on 40# bleached, calendered kraft stock liner; and 60# semi-gloss facestock (paper) coated with S246 general purpose permanent rubber based adhesive FDA compliant with 21 CFR 175.105 disposed on 40# bleached, calendered kraft stock liner. The preferred label stock is the latter 60# semi-gloss facestock coated with S246 disposed on 40# stock.

Laminating station 140 consists of a press roller 140a and roller support surface 140b. Press roller 140a is biased towards roller support surface 140b, for example by a spring, pneumatic piston-cylinder, hydraulic piston-cylinder, or other suitable biasing means. The laminating station presses each overlaminate strip 112b, 112d, with its adhesive side down, on to substrate 160 to bind the two materials together. Since overlaminate strips are carrying booklets 122b and 122d into the laminating station 140, the booklets end up sandwiched in between the overlaminate strips and substrate as they exit the laminating station. In one embodiment, the booklets are not adhered to the substrate. Substrate or label stock is provided as a web that is spooled off substrate roll 160r and married to the overlaminate bearing booklets, in registration if required, and laminated together under pressure. At least two overlaminate strips are adhered to the substrate or label web, where the overlaminate strips and web are parallel to each other.

The laminated webs are conveyed out of laminating station 140 towards die cutting station 170, for example along conveyor belt 150 in a downstream direction 150a. A plan view of the webs entering and exiting die cutting station 170 may be seen in FIG. 8. The substrate 160 has two overlaminate strips 112*b* and 112*d* running parallel along the length of substrate 160. The overlaminate strips 112*b*, 112*d* and substrate 160 have booklets 122*b*, 122*d* laminated therebetween and spaced along the length thereof. The dotted line rectangles 172*b*, 172*d* represent the proposed die cut locations. The proposed die cut locations 172*b*, 172*d*, will cut portions of substrate only along the sides parallel to the downstream direction D. The proposed die cut locations 172*b*, 172*d*, will cut portions of substrate and substrate/ laminate along the sides perpendicular to the downstream direction D. Die cutting station 170 includes deep die cutters 170*a*, one for each laminate strip. A cutter support 170*b* provides a suitable surface below the substrate or conveyor belt. The booklets are received within the deep inner portion of the die and do not interact with the cutting portion of the die. In other words, the die cut is around and beyond the periphery of the booklets.

Figure 8:
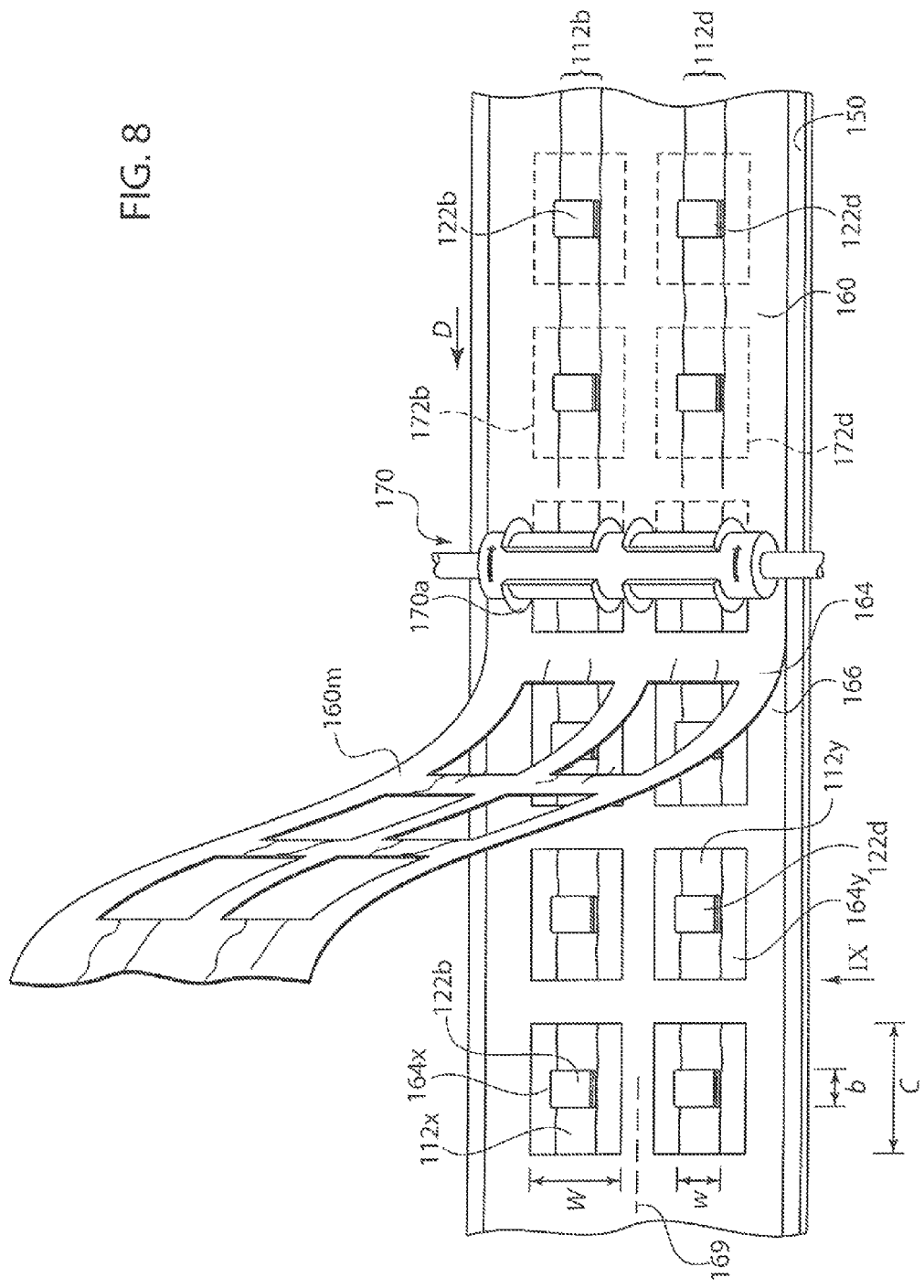
FIG. 8 is a schematic top plan view of the die cutting station.

As can be seen on the left side of FIG. 8, the die has cut two-up windows across the width of the webs. The remaining section of the web form a series of figure eights that constitute a matrix 160*m*. The matrix is typically the paper layer of the label, along with small sections of overlaminate strips. Remaining on release liner 166 are paper layer sections 164*x*, 164*y*, with booklets 122*b*, 122*d* and overlaminate section 112*x*, 112*y*. In a non-limiting example, the paper layer sections have a width W that is greater than the width w of the overlaminate and booklets. The overlaminate and paper layer sections have a length C that is greater than the length b of the booklets. Indicia that is printed on paper layer 164*x* beyond the width w and the length b of the booklet 122*b*, will be visible on the completed label.

Figure 9:
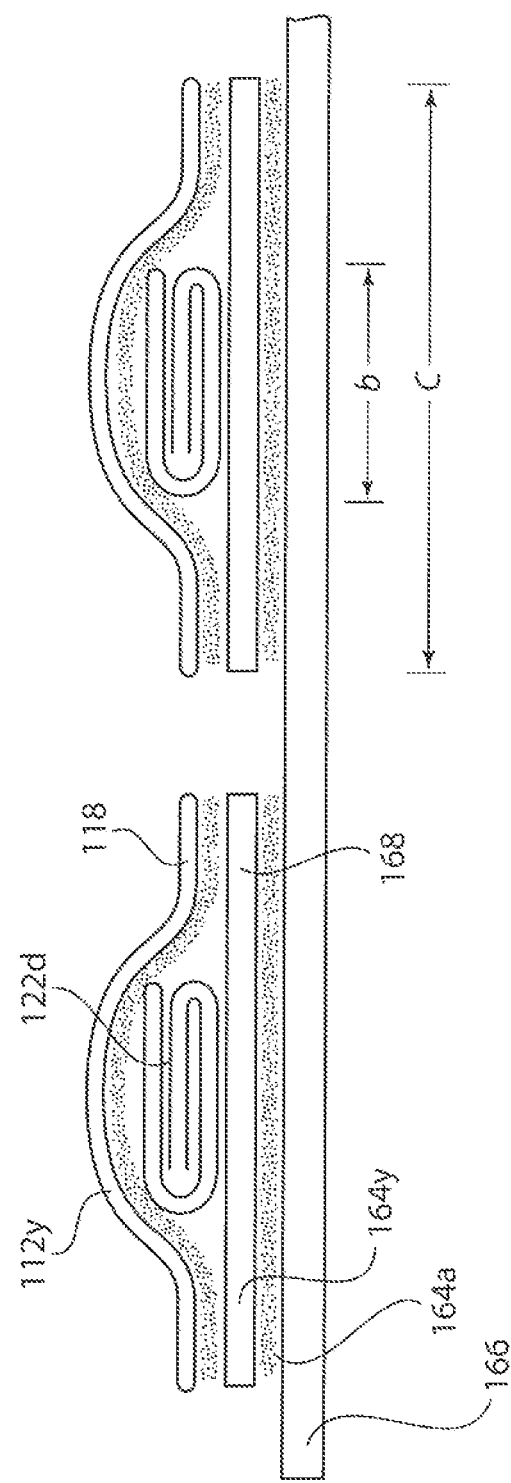
FIG. 9 is a side elevational view of the completed extended content booklet labels on the release liner.

As can be seen in FIG. 9, the die has severed the overlaminate strips 112*d* and paper layer 160 at the same longitudinal locations to form overlaminate sections 112*y* and paper layer sections 164*y* having the same width C. The continuous overlaminate and paper layer are effectively stamped into small islands which have a booklet disposed thereon. The overlaminate is trimmed in the longitudinal direction, while the paper layer is cut in a closed form, for example a rectangular shape. The paper layer is cut so that a strip of paper layer extends continuously across the width and across the length of substrate 160. This continuous extension of the paper layer forms the matrix 160*m* that can be removed along with small waste sections of overlaminate strip.

Referring back to FIG. 6, waste matrix 160*m* is removed from the process, and taken up on a waste substrate roll 160*a*. Release liner 166 is slit along dotted line 169 and the two sections are wound onto spools designated as booklet/ substrate take-up 162*a* and 162*b*. Alternatively, substrate 160 could have been provided as separate streams, corresponding to overlaminate strips 122*b* and 122*d*. Slitting of the single layer release liner is conventional and can be accomplished by a single blade commonly known as a web slitter. The manufacturing method allows booklet labels to be formed in a continuous process. The progressive slitter 130, laminator 140 and die cutter 170 can all operate at web transport speeds. In other words, the speed of anvil 132 and die cutter 170*a* can be synchronized to the speed of the moving web. The rotational speed of the anvil and die cutter where they interact with the web are matched to the longitudinal speed of the web along its downstream direction D. Accordingly extended content booklets can be produced by the inventive method in about the same time it would take to print and convert flat two dimensional labels from label stock. By way of example only, a twelve inch wide laminate and label stock webs can run at web speeds and produce eight multi-up extended content booklet labels. In other words, there would be eight take up rolls 162 at the end of the process.

In use, take-up roll 162 is unwound and the completed labels are peeled off the release liner and the label 164*y* is adhered to a container. FIG. 10A shows label 164*y* adhered to a cylindrical plastic bottle 200. The section of overlaminate where it transitions from label 164*y* to booklet 112*d* forms a hinge. The hinge holds booklet 112*d* so that label 164*y* can freely conform to any radius container. In other words, label 164*y* can be adhered to the container without interference from the multiple pages of booklet 112*d*.

The release liner 166 may wrap around a peel edge to release the completed label. As the label begins to separate from the web, a bottle is introduced. A roller 210 rotates clockwise while pressed against the bottle 200 which rotates counter-clockwise. As the label is progressively adhered the pages within the booklet can shift and slide without effecting the smooth application of the label to the curved surface. Often in prior art booklet labels, the booklet is adhered to the label. This arrangement ties the overlaminate, booklet and label together. When this ensemble has many pages or bends around a small radius, the outer pages need to travel a further distance than the inner pages. Since all components are tied together, the ensemble will crease. According to the invention, the label can adhere to the container while the booklet and laminate are free to independently conform to the containers radius. Thus, the booklet and label are being pressed against the container at the same time, but are free to shift and slide without interference from the other.

After label 164*y* is completed adhered, the roller then arrives at the laminate tab 118. The laminate tab 118 wraps the booklet 112*d* around the bottle 200 in direction 200*b* and adheres to the far side of the label, for example at label tab 168, as shown in FIG. 10B. Accordingly, one label configuration can be used on bottles with different radii. In addition, booklets of different styles, sizes and thicknesses can be used in a standard manufacturing set up. The laminate tab is self adjusting to enclose booklets of any thickness and securely hold them closed until needed.

The bottle with enclosed booklet as shown in FIG. 10B is ready to be packaged, shipped and sold. When the booklet needs to be accessed, the laminate tab 118 is peeled away from label tab 168 to carry the booklet away from the bottle, to a configuration shown in FIG. 10A. If the laminate tab is large or uses very strong adhesive, it may be desirable to reduce the holding strength to facilitate peeling the tab from the bottle. For this purpose, stripes of release material may be printed on the tab. The print area can be adjusted to determine how much adhesive will remain on the tab, thereby controlling the adhesive strength. The booklet can be unfolded at the two fold locations 10*z*(ii) and 10*z*(i) as shown in FIG. 10C. The user is presented with 6 or more pages of information, with all pages connected together at spine 10*d*. For certain applications, perforations may be provided. For example, a portion of the front page may be ripped off, or an entire page, e.g. the back page, may be ripped off.

While various forms of books and booklets have been shown and described, it should be understood that additional configurations may be provided within the scope of the application. For example, books with a greater number of pages may be provided. Books having two or more booklets contained therein may be included. Books with different fold locations and directions may be provided. In addition, several embodiments have been shown and described for a manufacturing process. Additional steps, or steps executed in different order are included within the scope of the invention. For example, adhesive and the release liner can be applied to the web before or after the labels are printed.

Having described preferred embodiments for books, booklets, folds, processes, apparatus and systems used therein for manufacturing extended content booklet labels (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for manufacturing an instructional booklet mounted to a substrate comprising the steps of:
    providing a multi-up book having two or more booklets and a waste zone that share a common spine;
    adhering the multi-up book to an overlaminate that is larger than the booklets;
    progressively slitting the overlaminate and multi-up book into two or more overlaminate strips having booklets secured thereto; and
    applying the overlaminate strips to a substrate,
wherein the booklets are retained between the overlaminate strips and the substrate.

2. The method of claim 1, wherein said overlaminate comprises an overlaminate web traveling in a downstream direction D, and said adhering step further includes adhering a series of multi-up books spaced-apart along direction D of the overlaminate web, wherein said common spine is oriented perpendicular to the downstream direction D.

3. The method of claim 2, wherein each overlaminate strip includes a series of spaced-apart booklets adhered thereto, wherein each overlaminate strip and the adhered booklets have the same width w measured perpendicular to direction D.

4. The method of claim 3, wherein following said progressively slitting step, the method further includes:
    severing the overlaminate strips along the downstream direction D to form individual overlaminate sections corresponding to each booklet, wherein said individual overlaminate sections have a length C that is greater than the booklet length b.

5. The method of claim 3, wherein said progressively slitting step separates the multi-up books and overlaminate web with two parallel slits to form a waste ribbon between said overlaminate strips, wherein said waste ribbon includes a series of spaced-apart adhered book waste zones from between each booklet.

6. The method of claim 5, wherein said progressively slitting step separates the multi-up books and overlaminate web with an additional parallel slit to form an additional waste ribbon along the edge of said overlaminate, wherein said additional waste ribbon includes a series of spaced-apart adhered book waste zones from the edge of the book.

7. The method of claim 1, wherein said progressively slitting step includes progressively slitting with three or more blades that form a blade set, wherein each blade cuts deeper than the previous blade along the same line to form a single slit.

8. The method of claim 7, wherein said progressively slitting step includes wrapping the overlaminate partly around a cylindrical anvil and rotating the anvil to transport the multi-up book and overlaminate past the three or more blades that are increasingly closer to the anvil.

9. The method of claim 1, wherein following said applying step, the method further includes die cutting the overlaminate strip and substrate into sections around the booklet while the booklet is contained within a deep cavity of the die during die cutting.

10. The method of claim 9, wherein the substrate includes:
    a paper layer including a top surface devoid of adhesive and a bottom surface covered with adhesive, and
    a release liner that is adhered to the bottom surface.

11. The method of claim 10, wherein said die cutting step includes die cutting (i) the overlaminate strip into overlaminate sections and (ii) the paper layer into paper layer sections while avoiding cutting of the release liner to form an extended content booklet label, and wherein the overlaminate sections and the paper layer sections measured in direction D have the same length C which is greater than the booklet length b.

12. The method of claim 11, wherein the paper layer section has a width W that is greater than the common width w of the overlaminate strip and the adhered booklet.

13. The method of claim 11, wherein each overlaminate section hingedly attaches a corresponding booklet to the substrate, thereby forming an instructional booklet that folds away from the substrate, and wherein a lack of adhesive between the booklet and the substrate allows the substrate to bend without interference from the booklet.

14. The method of claim 13, wherein following said die cutting step, the method further includes adhering the instructional booklet and paper layer to a container, wherein the substrate and booklet are free to shift and slide with respect to each other and without interference from the other due to the lack of adhesive binding them together.

15. The method of claim 10, wherein prior to said applying step, the method includes printing indicia on the paper layer, wherein said applying step includes applying the overlaminate strips to said substrate so that the booklets are in registration with the printed indicia.

16. The method of claim 1, wherein the multi-up book has free ends opposite the spine, wherein the free ends are folded twice over towards spine to enclose the free ends within the book.

17. The method of claim 16, wherein the three panels comprise:
    a first panel adjacent the free ends which is centrally located within the multi-up book,
    a second panel adjacent the spine, and
    a middle panel extending between the first and second panels,
wherein the middle panel is longer than said first panel and shorter than said second panel.

18. The method of claim 17, wherein the second and middle panels form a ramp up on one side of the multi-up book leading to a central portion of the multi-up book which includes the first, second and middle panels, and wherein the second panel forms a ramp down on the other side of the multi-up book leading from the central portion of the multi-up book.

19. The method of claim 18, wherein the ramp up includes two panels, and wherein the central portion includes three panels, and wherein the ramp down includes one panel.

20. The method of claim 1, wherein the multi-up book is selected from the group consisting of:
    one sheet folded in half to form a spine with a front cover and a back cover;

one sheet folded in half with adhesive, then cross folded to form a spine with a front cover, a back cover and two internal sheets;

one sheet accordion folded with adhesive then folded in half to form a spine with a front cover, a back cover and internal sheets;

one sheet folded in half with additional pages adhered inside to form a spine with a front cover, a back cover and internal sheets;

multiple sheets folded in half and nested with spines adhered; and multiple sheets folded in half and stacked with spines adhered.

\* \* \* \* \*